US009008425B2

(12) United States Patent
Dejean et al.

(10) Patent No.: US 9,008,425 B2
(45) Date of Patent: Apr. 14, 2015

(54) DETECTION OF NUMBERED CAPTIONS (71) Applicant: Xerox Corporation, Norwalk, CT (US)

(72) Inventors: Herve Dejean, Grenoble (FR);
Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 132 days.

(21) Appl. No.: 13/752,722

(22) Filed: Jan. 29, 2013

(65) Prior Publication Data
US 2014/0212038 A1 Jul. 31, 2014

(51) Int. Cl.
G06K 9/00 (2006.01)

(52) U.S. Cl.
CPC ........................ *G06K 9/00* (2013.01)

(58) Field of Classification Search
CPC ....... G06K 9/00; G06K 9/20; G06K 9/00456; G06K 9/00463; G06F 17/21; G06F 17/211; G06F 17/00; G06F 17/30; G06T 7/40; G06T 11/60; H04N 1/387; H04N 1/41
USPC ......... 382/176, 177, 309, 181, 173, 243, 170, 382/171, 178, 209, 100, 232, 231, 310, 311, 382/182, 239; 707/28, 769, E17.02; 715/243
See application file for complete search history.

(56) References Cited

U.S. PATENT DOCUMENTS

| | | | |
|---|---|---|---|
| 5,708,730 A | 1/1998 | Itonori | |
| 5,848,185 A * | 12/1998 | Koga et al. | 382/173 |
| 6,341,176 B1 * | 1/2002 | Shirasaki et al. | 382/229 |
| 6,360,006 B1 * | 3/2002 | Wang | 382/162 |
| 6,785,420 B2 | 8/2004 | Yamaai | |
| 7,133,565 B2 * | 11/2006 | Toda et al. | 382/243 |
| 7,149,352 B2 * | 12/2006 | Fujiwara | 382/181 |
| 7,203,364 B2 * | 4/2007 | Yamazaki | 382/177 |
| 7,392,473 B2 | 6/2008 | Meunier | |
| 7,693,848 B2 | 4/2010 | Dejean et al. | |
| 7,715,640 B2 * | 5/2010 | Ozawa | 382/239 |

(Continued)

FOREIGN PATENT DOCUMENTS

JP 2010010821 A * 1/2010 ............... H04N 1/04

OTHER PUBLICATIONS

Lin, et al. "Mathematical Formula Identification in PDF Documents" 2011 Intern'l Conf. on Document Analysis and Recognition, IEEE 2011, pp. 1419-1423.

(Continued)

*Primary Examiner* — Mekonen Bekele
(74) *Attorney, Agent, or Firm* — Fay Sharpe LLP (57) ABSTRACT

A method of detection of numbered captions in a document includes receiving a document including a sequence of document pages and identifying illustrations on pages of the document. For each identified illustration, associated text is identified. An imitation page is generated for each of the identified illustrations, each imitation page comprising a single illustration and its associated text. For a sequence of the imitation pages, a sequence of terms is identified. Each term is derived from a text fragment of the associate text of a respective imitation page. The terms of a sequence complying with at least one predefined numbering scheme which defines a form and an incremental state of the terms in a sequence. The terms of the identified sequence of terms are construed as being at least a part of a numbered caption for a respective illustration in the document.

21 Claims, 7 Drawing Sheets

(56) References Cited

U.S. PATENT DOCUMENTS

| | | | |
|---|---|---|---|
| 7,739,587 B2 | 6/2010 | Vion-Dury | |
| 7,752,538 B2 | 7/2010 | Vion-Dury | |
| 7,797,622 B2 | 9/2010 | Dejean et al. | |
| 7,852,499 B2 | 12/2010 | Dejean | |
| 7,853,873 B2* | 12/2010 | Gotoh et al. | 715/246 |
| 7,937,653 B2 | 5/2011 | Dejean et al. | |
| 7,991,709 B2 | 8/2011 | Dejean et al. | |
| 8,023,740 B2 | 9/2011 | Dejean | |
| 8,254,672 B2* | 8/2012 | Matsuoka | 382/166 |
| 8,384,952 B2* | 2/2013 | Hayasaki | 358/1.9 |
| 8,605,083 B2* | 12/2013 | Muijs | 345/419 |
| 2003/0103675 A1* | 6/2003 | Endo et al. | 382/229 |
| 2006/0155703 A1 | 7/2006 | Dejean et al. | |
| 2008/0065671 A1 | 3/2008 | Dejean et al. | |
| 2009/0110268 A1 | 4/2009 | Dejean et al. | |
| 2009/0110288 A1* | 4/2009 | Fujiwara | 382/190 |
| 2010/0107045 A1 | 4/2010 | Filippova et al. | |
| 2010/0174980 A1* | 7/2010 | Mansfield et al. | 715/234 |
| 2010/0306260 A1 | 12/2010 | Dejean | |
| 2011/0167081 A1* | 7/2011 | Kosaka et al. | 707/769 |
| 2011/0225490 A1 | 9/2011 | Meunier | |
| 2012/0005225 A1 | 1/2012 | Chidlovskii | |
| 2012/0079370 A1 | 3/2012 | Dejean | |
| 2012/0159313 A1 | 6/2012 | Dejean | |
| 2012/0317470 A1 | 12/2012 | Dejean | |
| 2012/0324341 A1* | 12/2012 | Dejean | 715/243 |
| 2014/0168697 A1 | 6/2014 | Nakane | 358/1.15 |

OTHER PUBLICATIONS

U.S. Appl. No. 13/484,708, filed May 31, 2012, Dejean.
U.S. Appl. No. 13/462,053, filed May 2, 2012, Meunier.

* cited by examiner

DETECTION OF NUMBERED CAPTIONS

BACKGROUND

The exemplary embodiment relates to the document processing arts and finds application in document conversion and structuring. In particular, it relates to the detection of captions having sequential features, such as numbers, and is described with particular reference thereto.

Techniques have been developed for converting documents in one format in which there is little or no document structure, to a structured format such as XML (extensible markup language), HTML (hypertext markup language), or SGML (standard generalized markup language). Typically, document conversion entails an initial conversion of the document to text fragments, which may be nested or otherwise organized, for example by paragraph, section, page, or the like. The document being converted typically also contains objects such as images, figures, gridded tables, and so forth which either cannot be represented as text fragments (as is typically the case for bitmapped images, for example) or are more appropriately represented as grouped objects (as is typically the case for gridded tables, for example). During conversion, objects that cannot be represented as text fragments are suitably stored in their native format, either embedded in the converted document or separately stored and linked to a suitable location in the converted document by a pointer or other link. Objects conducive to storage as grouped objects are grouped and stored as a grouped object (such as a table) that is suitably tagged.

To facilitate indexing, searching, structuring, or other organization of the converted documents, various automated techniques have been developed for recognizing parts of the document, such as page numbers, headers and footers, a table of contents, captions, and the like. Captions present a particular problem for document conversion. A caption is a textual element, such as a short explanation, annotation, description, legend, accompanying an illustration, such as an image, figure, or other object, and is typically converted as one or more text fragments during the initial document conversion processing. However, the caption is not a part of the general flow of text. Accordingly, if the caption is not recognized and addressed during document conversion, it causes an abrupt break in the reading flow, and additionally leaves its associated object unlabeled or unidentified.

Existing techniques for identifying captions have certain drawbacks. In one approach, the text fragment immediately below (or above) an object is assumed to be the caption for that object. A drawback of this approach is that it assumes that there is in fact a caption, and it further assumes a specific geometrical relationship between the caption and the associated object (such as below or above the object). The approach fails if either assumption is incorrect. Moreover, a caption that includes a contiguous group of text fragments may be misidentified by this approach. Another approach for identifying captions is to use a preselected keyword or other preselected heuristic to identify captions. For example, it may be assumed that a caption for a figure is any text fragment of the form "Fig. $ . . . " where "$" is a placeholder indicating a number or other enumerator and " . . . " indicates any following text. A drawback of this approach is that it may be over-inclusive or under-inclusive and the assumptions involved in this approach lead to limited applicability and susceptibility to errors in identifying the captions. Current OCR engines fail both to recognize diagrams correctly (zoning issues), and to recognize the associated caption.

U.S. Pat. No. 7,852,499, issued Dec. 14, 2010, entitled CAPTIONS DETECTOR, by Hervé Déjean discloses a caption detector which is designed to recognize textual elements related to an image. The textual elements can include the caption itself, but may also other textual elements that form a part of the image. Particularly in the case of diagrams and technical illustrations, textual elements that form the caption are difficult to recognize.

Accordingly, there remains a need in the art for improved techniques for identifying or detecting captions.

INCORPORATION BY REFERENCE

The following references, the disclosures of which are incorporated herein by reference in their entireties, relate generally to page layout analysis:

U.S. Pat. No. 5,708,730, entitled TABLE RECOGNITION APPARATUS, by Katsuhiko Itonori; U.S. Pat. No. 6,785,420, entitled METHOD AND APPARATUS FOR TABLE RECOGNITION, APPARATUS FOR CHARACTER RECOGNITION, AND COMPUTER PRODUCT, by Toshifumi Yamaai; U.S. Pat. No. 7,392,473, entitled METHOD AND APPARATUS FOR DETERMINING LOGICAL DOCUMENT STRUCTURE, by Jean-Luc Meunier; U.S. Pat. No. 7,693,848, entitled METHOD AND APPARATUS FOR STRUCTURING DOCUMENTS BASED ON LAYOUT, CONTENT AND COLLECTION, by Hervé Déjean, et al.; U.S. Pat. No. 7,739,587, entitled METHODS AND APPARATUSES FOR FINDING RECTANGLES AND APPLICATION TO SEGMENTATION OF GRID-SHAPED TABLES, by Jean-Yves Vion-Dury; U.S. Pat. No. 7,752,538, entitled GRAPHICAL SYNTAX ANALYSIS OF TABLES THROUGH TREE REWRITING, by Jean-Yves Vion-Dury; U.S. Pat. No. 7,797,622 (U.S. Pub. No. 20080114757), entitled VERSATILE PAGE NUMBER DETECTOR, by Hervé Déjean, et al.; U.S. Pat. No. 7,852,499, entitled CAPTIONS DETECTOR, by Hervé Déjean, U.S. Pat. No. 7,937,653 entitled METHOD AND APPARATUS FOR DETECTING PAGINATION CONSTRUCTS INCLUDING A HEADER AND A FOOTER IN LEGACY DOCUMENTS, by Hervé Déjean, et al.; U.S. Pat. No. 7,991,709 (U.S. Pub. No. 20090192956), entitled METHOD AND APPARATUS FOR STRUCTURING DOCUMENTS UTILIZING RECOGNITION OF AN ORDERED SEQUENCE OF IDENTIFIERS, by Hervé Déjean, et al.; U.S. Pat. No. 8,023,740, entitled SYSTEMS AND METHODS FOR NOTES DETECTION, by Hervé Déjean; U.S. Pub. No. 20060155703, entitled METHOD AND APPARATUS FOR DETECTING A TABLE OF CONTENTS AND REFERENCE DETERMINATION, by Hervé Déjean, et al.; U.S. Pub. No. 20080065671, entitled METHODS AND APPARATUSES FOR DETECTING AND LABELING ORGANIZATIONAL TABLES IN A DOCUMENT, by Hervé Déjean, et al.; U.S. Pub. No. 20090110268, entitled TABLE OF CONTENTS EXTRACTION BASED ON TEXTUAL SIMILARITY AND FORMAL ASPECTS, by Hervé Déjean, et al.; U.S. Pub. No. 20100107045, entitled METHODS AND APPARATUSES FOR INTRA-DOCUMENT REFERENCE IDENTIFICATION AND RESOLUTION, by Katja Filippova, et al.; U.S. Pub. No. 20100174980, entitled IDENTIFICATION OF REGIONS OF A DOCUMENT, by Philip Mansfield, et al.; U.S. Pub. No. 20100306260, entitled NUMBER SEQUENCES DETECTION SYSTEMS AND METHODS, by Hervé Déjean; U.S. Pub. No. 20110225490, entitled DOCUMENT ORGANIZING BASED ON PAGE NUMBERS by Jean-Luc Meunier; U.S. Pub. No. 20120005225, entitled METHOD FOR LAYOUT BASED DOCUMENT ZONE QUERYING, by Boris Chidlovskii; U.S. Pub. No. 20120079370, entitled SYSTEM AND METHOD FOR PAGE FRAME DETECTION, by Hervé Déjean; U.S. Pub. No. 20120159313, entitled SYSTEM AND METHOD FOR LOGICAL STRUCTURING OF DOCUMENTS BASED ON TRAILING AND LEADING PAGES, by Hervé Déjean; U.S. Pub. No. 20120317470, entitled A GENERATE-AND-TEST METHOD FOR COLUMN SEGMENTATION by Hervé Déjean; U.S. Pub. No. 20120324341, entitled DETECTION AND EXTRACTION OF ELEMENTS CONSTITUTING IMAGES IN UNSTRUCTURED DOCUMENT FILES, by Hervé Déjean; U.S. application Ser. No. 13/484,708, filed on May 31, 2012, entitled TYPOGRAPHICAL BLOCK GENERATION, by Hervé Déjean; and U.S. application Ser. No. 13/462,053 filed on May 2, 2012, entitled POST OPTICAL CHARACTER RECOGNITION DETERMINATION OF FONT SIZE, by Jean-Luc Meunier.

BRIEF DESCRIPTION

In accordance with one aspect of the exemplary embodiment, a method of detection of numbered captions in a document includes receiving a document including a sequence of document pages and identifying illustrations on pages of the document. For each identified illustration, associated text is identified. An imitation page is generated for each of the identified illustrations, each imitation page including a single illustration and its associated text. For a sequence of the imitation pages, a sequence of terms is identified. Each term is derived from a text fragment of the associate text of a respective imitation page. The terms of a sequence comply with at least one predefined numbering scheme which defines a form and an incremental state of the terms in a sequence. The terms of the identified sequence of terms are construed as being at least a part of a numbered caption for a respective illustration in the document.

The method may be performed, at least in part, by a computer processor.

In accordance with another aspect of the exemplary embodiment, a system for detection of numbered captions includes a graphical object detector for identifying illustrations on pages of a document that includes a sequence of document pages. A related text detector is provided for identifying associated text for each identified illustration. An imitation page generator is provided for generating an imitation page for each of the identified illustrations, each imitation page including a single illustration and its associated text. A sequence detector identifies a sequence of terms for a sequence of the imitation pages. Each term in the sequence is derived from a text fragment of the associate text of a respective imitation page. The terms of a sequence comply with at least one predefined numbering scheme which defines a form and an incremental state of the terms in a sequence. A numbered captions identifier construes the terms of the identified sequence of terms as numbered captions for respective illustrations in the document. A processor implements the graphical object detector, related text detector, imitation page generator, sequence detector, and numbered captions identifier.

In accordance with another aspect of the exemplary embodiment, a method of detection of numbered captions in a document includes receiving a document comprising a sequence of document pages. The document pages include graphical elements and text elements. Illustrations on pages of the document are identified based on the graphical elements. This includes segmenting the page into illustration zones without considering any of the text elements on the pages. Each zone includes a respective illustration. For each identified illustration, associated text from the text elements is identified. An imitation page is generated for each of the identified illustrations, each imitation page comprising a single illustration and its associated text. For a sequence of the imitation pages, the method includes identifying a sequence of terms, each term derived from a text fragment of the associate text of a respective imitation page, the terms of a sequence complying with at least one predefined numbering scheme applicable to page numbers of a document. Numbered captions are identified for respective illustrations in the document based on the terms of the identified sequence of terms.

DETAILED DESCRIPTION

Figure 1:
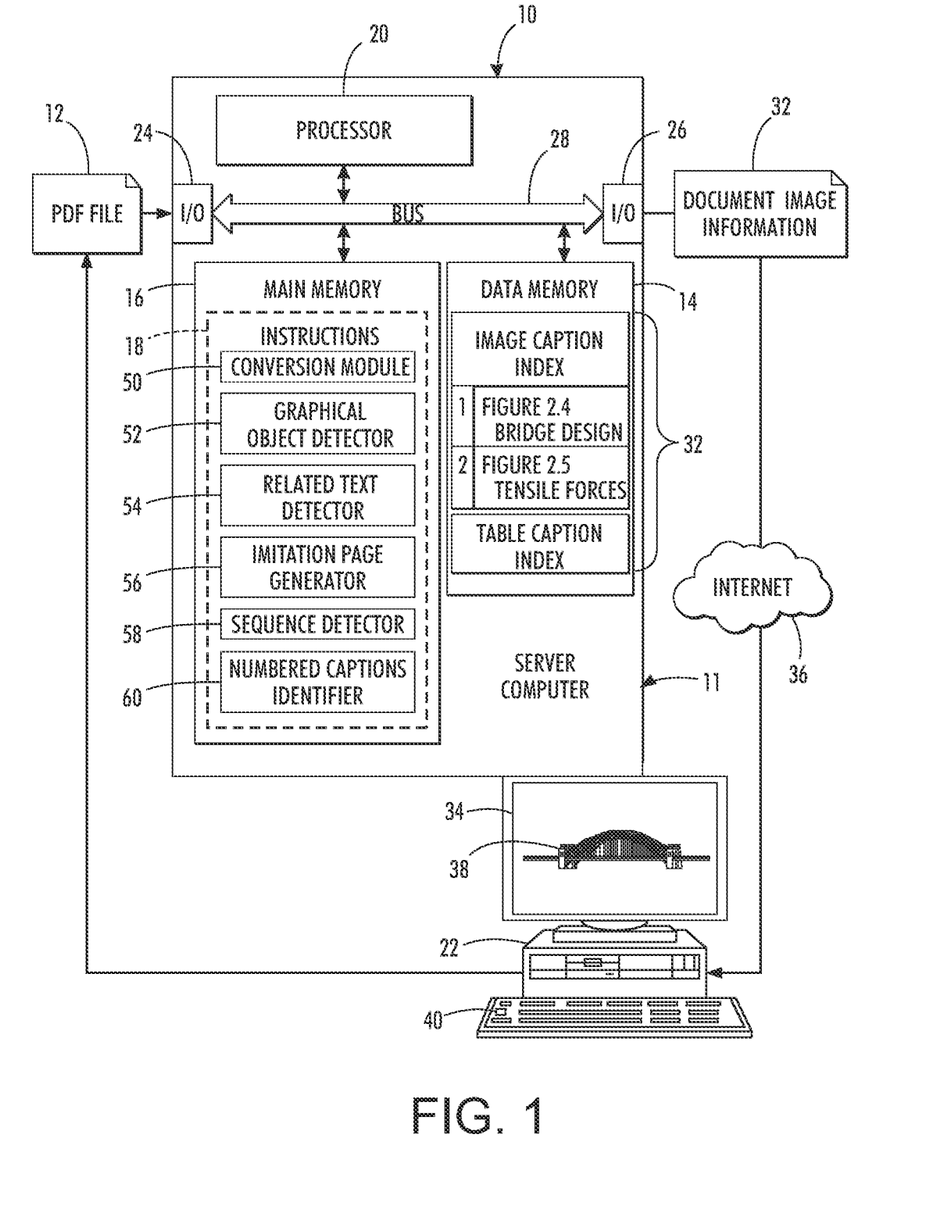
FIG. 1 is a functional block diagram of a captions detection system in accordance with one aspect of the exemplary embodiment.

With reference to FIG. 1, a system 10 for detection of numbered (sequentially-defined) captions in a multi-page document is shown. System 10 may include one or more specific or general purpose computing devices, such as the illustrated server computer 11. The system 10 receives, as input, an unstructured document 12 and stores the document in memory 14 during processing. The document 12 is received in electronic form and can be a technical manual, book, journal publication, or the like. The exemplary document 12 is in a page description language, such as a PDF, Portable Document Format (Adobe Systems) file, although other unstructured documents are also contemplated, such as PostScript (Adobe Systems), PCL, Printer Command Language (Hewlett-Packard), such as PCL-5, PCL-5E, PCL-6, PCL-XL, and the like. In PDF, for example, each page of a document is assigned a set of elements, such as text elements and graphical elements, and their respective sizes and locations are identified in a job ticket. The exemplary document 12 may be a multi-page document, where each page is associated with a set of elements (text, graphical elements, etc.), which allows information from multiple pages to be used for identification of captions.

Main memory 16 of the system 10 stores instructions 18 for performing the exemplary method. These instructions 18 are implemented by an associated processor 20, such as the computer 11's CPU. The system 10 communicates with external devices, such as client device 22, via one or more input/output (I/O) devices 24, 26. The input device 24 and/or 26 may include a modem link, a wired or wireless connection, USB port, floppy or hard disk receiver, or the like and may be separated or combined with other components of the system 10. The components 14, 16, 20, 24, 26 of the system 10 are communicatively linked by a data/control bus 28.

While a collection of documents could be processed, rather than a single PDF document 12, the exemplary method is best suited to processing documents singly. Prior to inputting, the document pages may be stored in any suitable non-transitory storage media such as a disk, ROM or RAM, or may be input into the system 10 in the form of a carrier wave, e.g., via the Internet.

While the illustrated source of the document 12 is a client computing device 22 (which may be similarly configured to computer 10, except as noted), it will be appreciated that the document 12 may be input from a scanner or other digital image capture device. Such a device may be associated with an Optical Character Recognition (OCR) engine for processing the output of the scanner to generate the pages of document 12. In other embodiments, system 10 may incorporate an OCR engine, e.g., in memory 16.

The system 10 may comprise one or more computing devices 11, such as a personal computer, PDA, laptop computer, server computer, or combination thereof. Memories 14, 16 may be integral or separate and may represent any type of computer readable medium such as random access memory (RAM), read only memory (ROM), magnetic disk or tape, optical disk, flash memory, or holographic memory. In one embodiment, the memories 14, 16 comprise a combination of random access memory and read only memory. In some embodiments, the processor 20 and memory 14, 16 may be combined in a single chip.

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 10, executes instructions stored in memory 16 for performing the method outlined in FIG. 2.

The system 10 may output document information 32, specifically, information related to numbered captions identified in the pages of the input document 12, to an output device, such as external memory, e.g., of client device 22, or a display device 34, having a screen, such as an LCD screen, on which document page information may be displayed, or a hardcopy output device, such as a printer, or the like. The output device 34 may be connected directly with the system or linked thereto, e.g., via a wired or wireless link 36 to client device 22, such as a local area network, wide area network, or the Internet. The system 10 may generate a graphical user interface (GUI) 38 for display to a user on the display device 34. The exemplary GUI enables a user to interact with the system 10 via the display screen 34 with a user input device 40, such as a cursor control device, keyboard, keypad, joystick, touchscreen, combination thereof, or the like. In the exemplary embodiment, display screen 34 is linked to the client computing device 22 and device 22 includes a web browser which allows the user to interact with the computing device 11. In other embodiments, the information 32 may be output to another external memory storage device or other computing device, or the document pages may undergo further processing before information is output.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The system and method described herein can use, as resources, some of the tools described in U.S. Pat. Nos. 7,852, 499, 7,392,473, 7,739,587, and U.S. Pub. No. 20120324341, which can be adapted to the present method, as described in further detail below.

The illustrated instructions 18 may be in the form of hardware or a combination of hardware and software and may include a conversion module 50, a graphical object detector 52, a related text detector 54, an imitation page generator 56, a sequence detector 58, and a numbered captions identifier 60. As will be appreciated, system 10 may include fewer or more components while still having the same functionality. For example, components 50, 52, 54, 56, 58, 60 may be combined to form fewer components, or may be functionally separated to form more individual components. These components are best understood with reference to the exemplary method, which is described with reference to FIG. 2.

Briefly, the conversion module 50 converts the page description language document 12 to a markup language (e.g., XML) document, if not already in this format.

The graphical object detector 52 detects graphical objects on each document page 62 (exemplified in FIG. 3) which are candidate document illustrations and which are potentially associated with a numbered caption. The graphical objects detected may include raster graphic objects and/or vector graphic objects, such as drawings, tables, charts, equations, and the like, and combinations thereof. The term "illustration" is used to describe any collection of one or more graphical objects which are to be viewed together; this collection of graphical objects (and optionally associated text) may have a single, respective numbered caption. The exemplified illustrations include illustrations generally considered as images and optionally those considered as tables and/or equations. While particular reference is made to images, it is to be appreciated that such other illustrations are contemplated. By "numbered caption," it is meant that at least part of the identified caption for an illustration includes a "number" which complies with a predefined sequential numbering scheme when considered in relation to the numbered caption(s) of one or more preceding or subsequent illustrations in the document, as outlined below.

The related text detector 54 detects related text associated with the relevant graphical objects. The related text can be considered as candidate captions, i.e. it is from the related text that numbered captions, if present, are to be identified. The related text is identified from among the text elements identified on the page, e.g., by an OCR engine (not shown).

The imitation page generator 56 generates an imitation page 64, 66 for each identified images on the document page. Each imitation page includes only one identified illustration, and thus a single document page may result in zero, one, two, or more imitation pages (exemplified in FIG. 4). Each imitation page includes the identified graphical object(s) constituting an identified illustration and identified related text, but excludes text that is identified as not being associated with any of the identified illustrations, such as surrounding text (running text). Imitation pages 68 are optionally created for table structures in a similar manner.

The sequence detector 58 treats each imitation page 64, 66 as a separate page of a multipage imitation document and seeks to identify sequences of text terms comprising fragments of the related text which have a sequential pattern which extends over multiple imitation pages analogous to page numbers, i.e., a maximum of one term of the term sequence per imitation page.

The numbered caption identifier 60 identifies numbered captions based on the identified term sequences and may label the corresponding text with a label denoting the text as a numbered caption, or part thereof.

Figure 2:
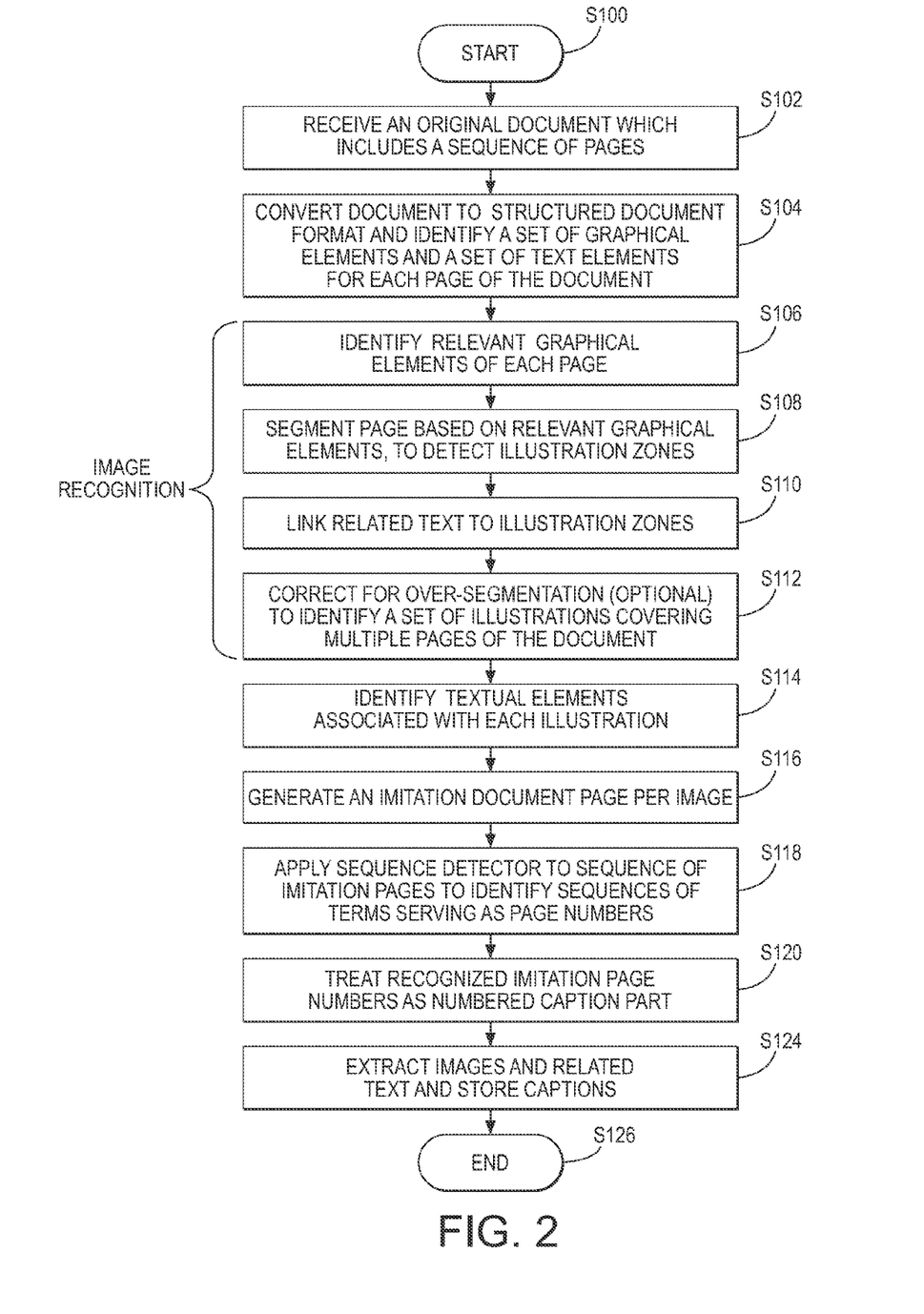
FIG. 2 is a flow of a captions detection method in accordance with another aspect of the exemplary embodiment.
Figure 3:
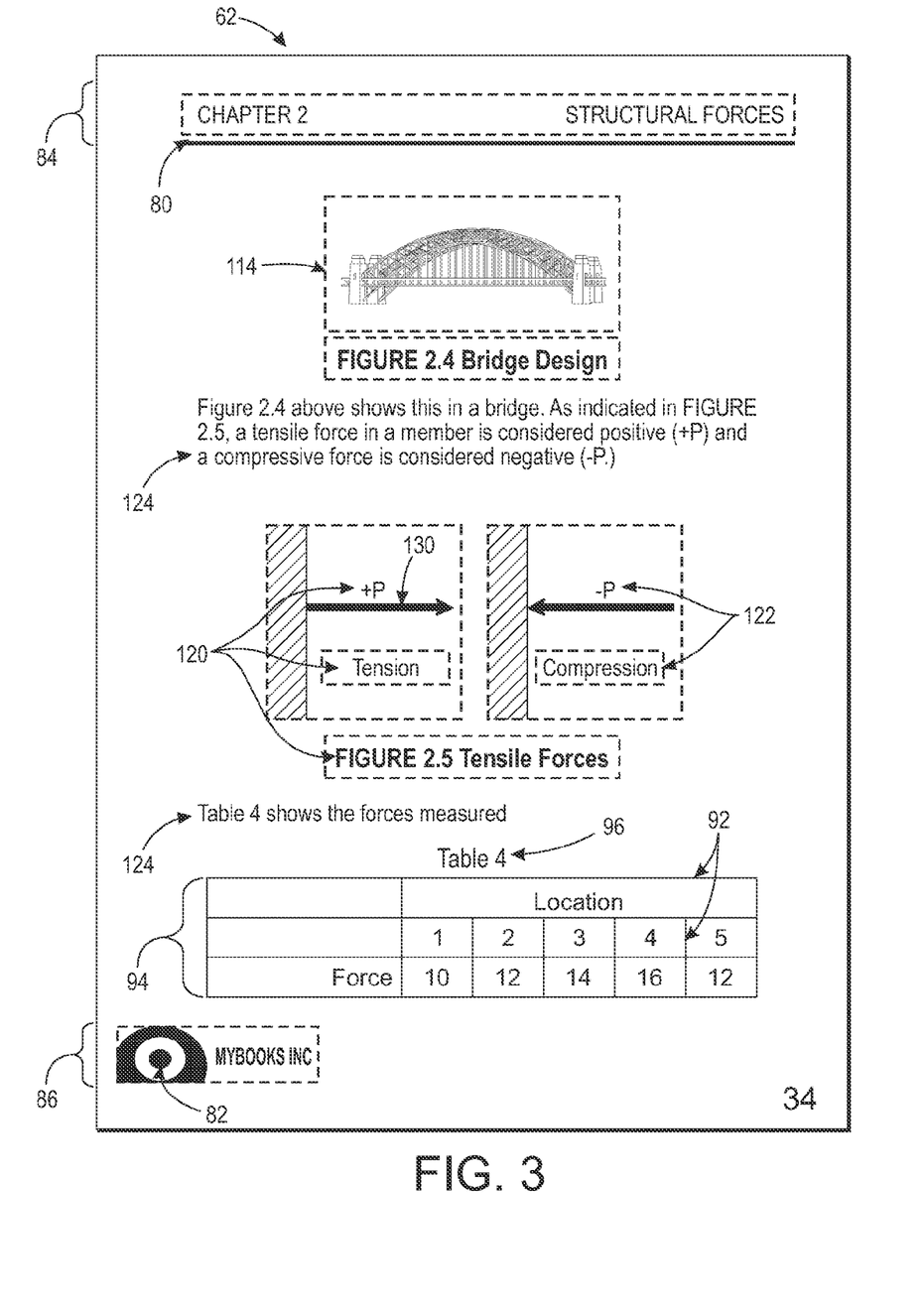
FIG. 3 illustrates a page of a multipage document to be processed by the exemplary method.
Figure 4:
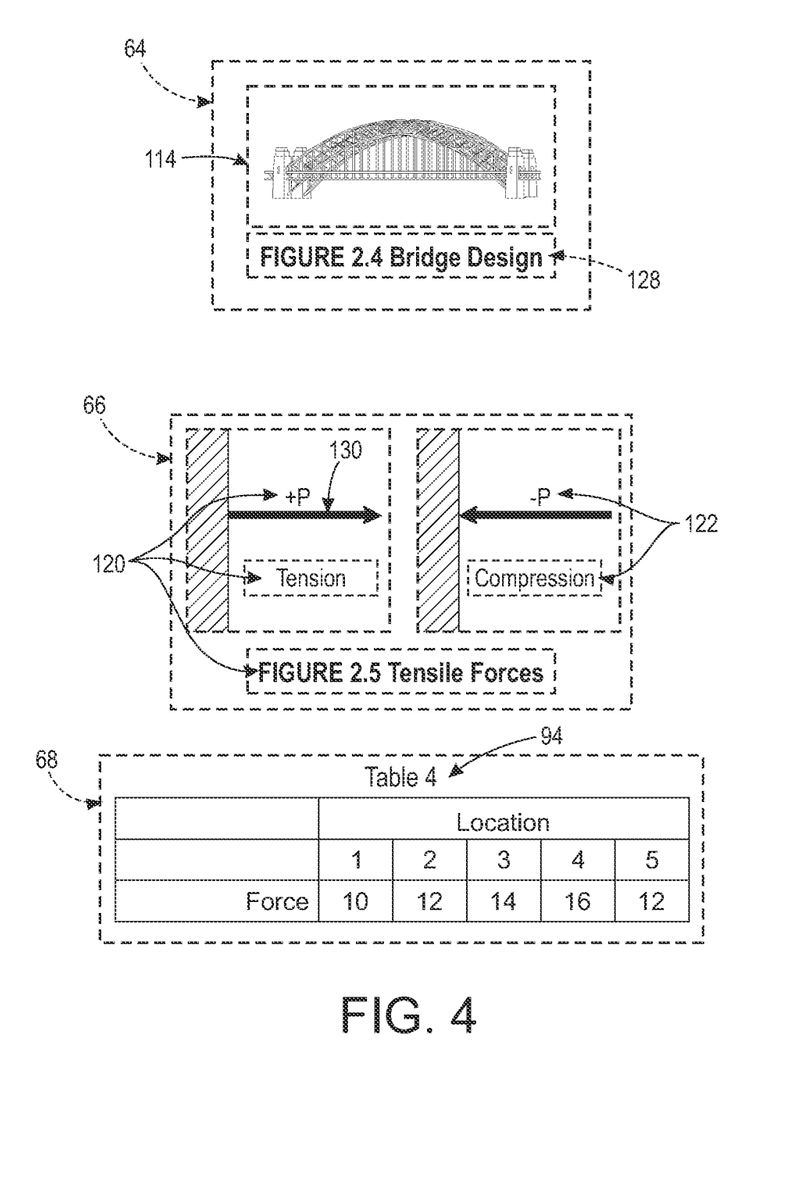
FIG. 4 illustrates 3 imitation documents extracted from the page of FIG. 3, each comprising one or more graphical elements and associated text.

With reference now to FIG. 2, a method for identifying sequentially defined, numbered captions for graphical objects of an unstructured document 12, such as a PDF file, is illustrated. FIG. 3 illustrates an example document page 62 and FIG. 4 illustrates part of a sequence of imitation pages 64, 66 extracted therefrom (imitation page 68 may be treated as part of a separate sequence), which are used to illustrate aspects of the method.

The method begins at S100. At S102, an unstructured document 12, e.g., in a PDF format, is input to the apparatus 11 and stored in memory 14. The received document includes a set of pages 62, which are assumed to be in order, based on the order in which they were scanned or otherwise assembled. Initial processing, e.g., with an OCR engine, may have already been performed, to identify text elements on the page, or this may be performed with an OCR engine of the system 10.

At S104, the document 12 is converted by the conversion module 50 into an alternative language format, such as XML or other structured format, and stored in memory 14. A set of graphical elements and a set of text elements associated with each page 62 of the document are separately identified (for some document pages, one or both of these sets may be an empty set) by the graphical object detector 52 and a text element detector (e.g., an OCR engine), and stored in memory 14.

Illustrations (e.g., images) are then recognized in each document page, which may include segmenting the page based only on the locations of graphical elements, without considering locations of the text elements. Text elements form the identified text is associated with the images in the zones created by segmentation. Optionally, over-segmentation is corrected for using the linked text as a guide. The image recognition stage may proceed as outlined in more detail in S106-S112.

At S106, relevant graphical elements of each page are identified. The relevant graphical elements are considered to be those of the graphical elements on the page which are likely to form part of a captioned image (or table). This step may include first excluding from further consideration any graphical elements 80, 82 serving as part of page constructs 84, 86 (e.g., headers and footers illustrated in FIG. 3) of a document page 62. Such elements are optionally detected based on detecting that they occur on multiple pages and then are removed from consideration as relevant graphical elements (candidate captioned illustrations). This can be performed by considering appropriate regions of multiple document pages to identify similar graphical elements in the same page locations, as described, for example, in U.S. Pub. No. 20120324341. Page 62, for example, shows a vector graphic 80 (a line) in the header region 84 and a raster graphic 82 in the footer region 90. As will be appreciated, where headers and footers of a given document are not expected to contain graphical elements, this step can be omitted.

Similarly, any graphical elements serving as text formatting elements may be detected and removed from consideration as relevant graphical elements. The text formatting elements are vector graphic elements that are used to format text, such as table frames and text boxes. For example, the lines 92 in the table 94 on page 62 (FIG. 3) may be detected and removed. In other embodiments, the method may be used to detect captions associated with tables, such as the caption 96 showing "Table 4." In this embodiment, vector graphics forming the table frame are retained, but may be processed separately from the other graphical elements (those that are candidate images).

Figure 5:
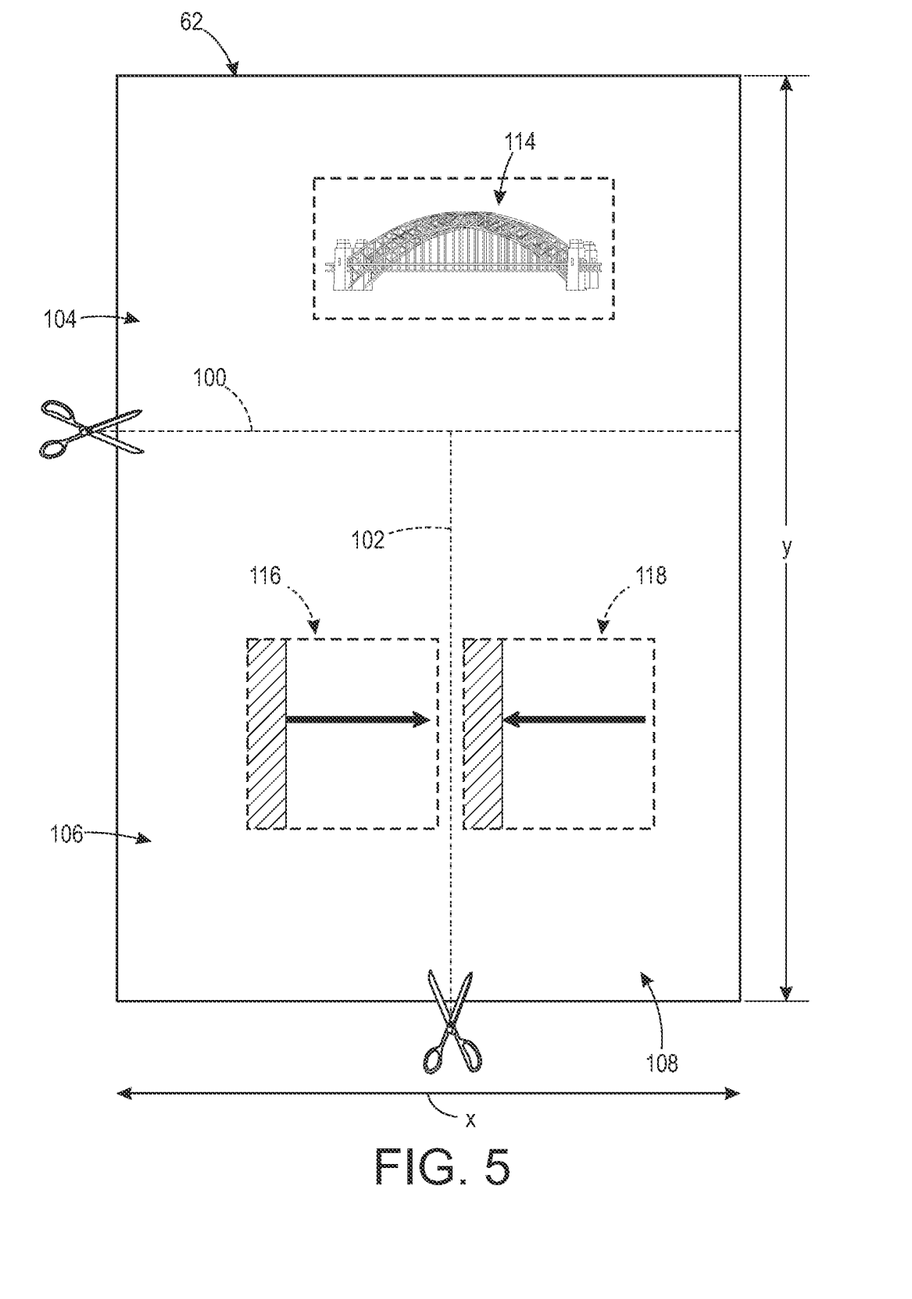
FIG. 5 illustrates segmenting the relevant graphical elements of the page of FIG. 3 into image blocks in accordance with one example embodiment.
Figure 6:
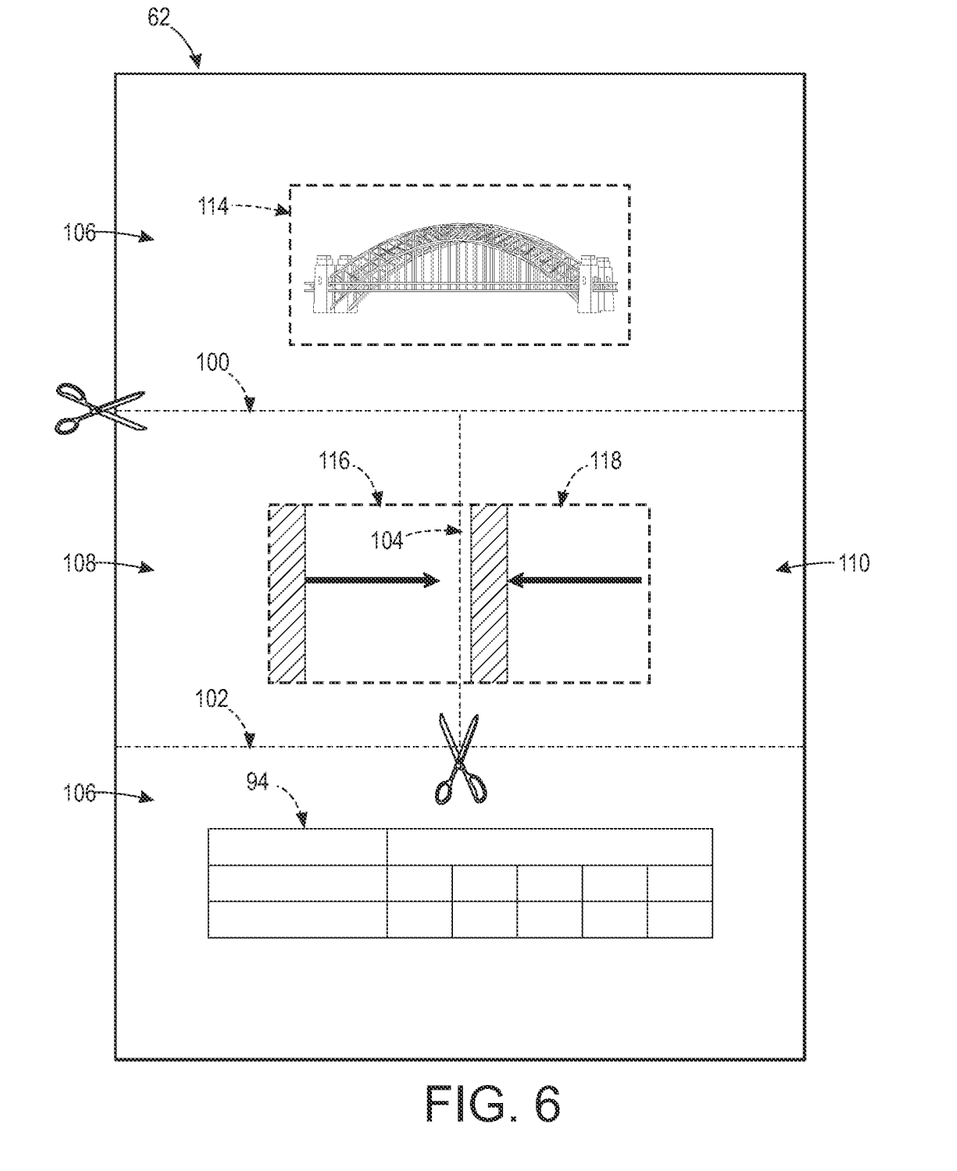
FIG. 6 illustrates segmenting the relevant graphical elements of the page of FIG. 3 into image blocks in accordance with another example embodiment.

At S108, the page 62 is segmented, as illustrated in FIGS. 5 and 6. In this step, remaining relevant graphical elements of the page, after (optional) extraction of any text formatting and page construct elements, are segmented into zones which are predicted to each contain a candidate image (or a table), although this may not always be the case, if over-segmentation has occurred. The identified set of text elements is not considered in the segmenting step. For example, as illustrated in FIG. 5, the segmentation along horizontal X and vertical Y cut lines 100, 102, using white space between graphical elements to identify the suitable locations of the cuts, may identify a set of rectangular zones 104, 106, 108, each containing at least one of the relevant graphical elements. FIG. 6 shows a similar segmentation, but where the graphical elements 94 forming the table are also considered in the segmenting step to create an additional zone 112. For each zone 104, 106, 108, the set of graphical elements in the zone is considered a candidate illustration 114, 116, 118.

For other types of illustration, different detection methods may be appropriate. Methods for detection of tables in unstructured documents are described, for example in above-mentioned U.S. Pat. No. 7,752,538. Formulas (equations) can be identified using the method of Xiaoyan Lin, Liangcai Gao, Zhi Tang, Xuan Hu, "Mathematical Formula Identification in PDF Documents," 2011 Intern'l Conf. on Document Analysis and Recognition, pp. 1419-1423, IEEE 2011.

At S110, candidate captions are identified for each illustration zone. In particular, those text elements that are sufficiently related to a candidate illustration 114, 116, 118 are detected and linked to a respective related image-type illustration zone 104, 106, 108. Similarly, those text elements that are related to a candidate table 94 are optionally detected and linked to a respective related table-type illustration zone 112 (FIG. 6). In general, this is performed by assigning text elements from the set of text elements to the illustration zone containing the closest graphical object, after applying a threshold on distance from the graphical object(s) in the zone and optionally other constraints to eliminate text elements that are unlikely to be a caption. No text element is associated with more than one illustration zone. For example, the text elements 120 (FIG. 3), are linked to illustration zone 106 (FIG. 5), while elements 122 are linked to illustration zone 108. Remaining text elements (generally running text 124, FIG. 1) can thereafter be ignored.

Optionally, at S112, correction for over-segmentation may be performed using the linked text elements by computing the overlap of bounding boxes which surround the candidate images including any related text elements. For example, this results in the two groups of graphical objects in illustration zones 106 and 108, and their related text elements 120, 122 being grouped into a single image-type illustration zone as the graphical elements 116 and 118 are determined to be part of the same image 126 (FIG. 4).

At S114, the textual elements associated with each respective image 114, 126, are identified.

At S116, a set of imitation pages 64, 66 is generated, one page for each of the illustration zones remaining after any merging of zones (FIG. 4) (and optionally also a set of imitation pages for tables). Each imitation page 64, 66 includes the respective image 114, 126 and its related text 128, or 120 and 122. The imitation pages 64, 66, in combination with imitation pages generated from preceding and subsequent document pages, are considered to form an ordered sequence (an imitation document). The relative positions of the imitation pages in the sequence obey the same order as do the illustrations in the original document. The order of the illustrations in the original document may be determined by taking the conventional reading order of pages into consideration (top to down, left to right in English language documents). See, for example, above-mentioned U.S. Pat. No. 7,392,473, for automated methods for identifying reading order of document objects. Thus, for example, imitation pages 64, 66 are ordered in the order found in the original page (image 114 is above image 126 in the original document and thus appears the first of the two in the sequence of imitation pages). Assuming that 10 imitation pages have been identified on preceding pages, then imitation pages 64, 66 may be numbered 11 and 12 in the imitation page sequence, respectively. Similarly, imitation pages generated from illustrations on subsequent pages of the original document would be numbered 13, 14, 15, etc. A second sequence of imitation pages may be generated for illustration zones containing graphical objects that are classed as tables, rather than as images, which would include imitation page 68.

As will be appreciated, the term "imitation page" is used to distinguish the structures created herein from actual pages of a document. An imitation page 64, 66, 68, in general, includes less than the entire content of the actual page 62 from which it was extracted, and a single actual page 62 may yield 0, 1, 2, or more imitation pages.

At S118, the sequence detector 58 is applied to the ordered sequence of imitation pages 64, 68 to identify a set of text fragments, the set including no more than one text fragment from each imitation page. In combination, the set of text fragments form a sequence of terms obeying a numbering scheme pattern that includes a fixed part (which may be empty) and an incremental (variable) part. For example, imitation page 64 includes text element 128, which includes the text fragment "FIG. 2.4" and consecutive imitation page 66 includes text element 120, which includes the text fragment "FIG. 2.5". These fragments follow a pattern including a fixed part: "FIGURE" and an incremental part: "2.4", "2.5". This step is analogous to the detection of page numbers for a sequence of pages.

At S120, the set of text fragments forming the incremental pattern is considered as the numbered captions for the respective images.

At S122 the resulting images, each image comprising at least one graphical element and any linked text, may be extracted from the rest of the document, labeled with an appropriate image label, stored in memory, output to an external device, and/or otherwise processed. The numbered caption for each image is identified, e.g., tagged with html tags, associated with the respective image, and stored in an image index, or otherwise identified and stored in memory.

The method ends at S126.

The method illustrated in FIG. 2 may be implemented in a non-transitory computer program product that may be executed on a computer. The computer program product may include a non-transitory computer-readable recording medium on which a control program is recorded (stored), such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

Various details of the system and method will now be described in further detail.

While U.S. Pat. No. 7,852,499, incorporated herein by reference, detects textual elements related to an illustration, it leaves open the question of determining the real caption from other textual elements. Taking the longest textual element as a caption may be useful, for example, in the case of multi-line texts. For technical documents and others, however, this rule is far less robust, where diagram may include other text and the caption itself may be relatively short. The exemplary method provides a more robust solution for detecting numbered captions, which may be of the form Figure X, Example Y, Table Z, and so forth, where X, Y, and Z are the incremental part.

The exemplary method takes as input a multipage document 12 comprising an ordered sequence of pages 62. The document can be a scanned version of a hardcopy document received from a scanner, a computer generated PDF document, or the like.

Identification of Illustrations

FIG. 3 illustrates just one of the pages 62 of such a document 12 for illustrating aspects of the system and method. The page 62 includes various graphical objects, such as vector graphics (e.g., line 80 and arrows 130) as well as raster graphics 82, 114, which may have already been grouped during preprocessing to resemble "images".

While header and footer parts of the page 84, 86 may include graphical objects, as illustrated at 80 and 82, for purposes of the exemplary method, these may be detected and then ignored by the graphical object detector 52 at S106. Methods exist for detection of headers and footers, based on repetitive or sequential aspects from page to page and location of these elements. See for example, above-mentioned U.S. Pat. No. 7,937,653 and U.S. Pub. No. 20120324341.

The detection of illustrations from among the remaining graphical elements involves detecting illustration zones in a page and is well suited to PDF files and scanned documents. The method may rely on an adaption of the XY-cut algorithm which is usually used for finding textual layout in a page, however, in the present case, it is applied only to graphical elements of a page. Two approaches are possible: a top-down segmentation (starting from the whole page and sub-segmenting) and a bottom-up one (agglutinating narrow elements). An algorithm for implementing a top-down approach is described, for example, in U.S. Pat. No. 7,392,473. The exemplary algorithm segments a page using horizontal and vertical white spaces. In particular, it cuts the page into zones by creating imaginary cuts along horizontal and/or vertical regions of white space, i.e., regions without "on" pixels that exceed a certain threshold width (shortest dimension). U.S. Pub. No. 20120324341 provides exemplary steps for performing the segmentation in one embodiment.

The exemplary method aims to group one or more of the relevant graphical objects into an illustration (i.e. what a human would consider an image). In order to solve this segmentation problem, the initial segmentation at S108 favors over-segmentation, rather than under-segmentation (potentially merging two images), and the correction of the over-segmentation is then dealt with in the further segmentation step at S112, as described, for example, in U.S. Pub. No. 20120324341. While a two-step segmentation is performed in the exemplary method, in other embodiments, a single segmentation step may be performed. The output of this step is the delimitation of illustration zones in a page (rectangular zones) each comprising only a single identified illustration.

Image Related Text Detection S110-S114

To identify the text associated with the detected illustrations, related-text detection may be performed, as described, for example, in above-mentioned U.S. Pat. No. 7,852,499 and U.S. Pub. No. 20120324341. In this method, any textual element related to an illustration is detected. The detected elements include captions but also textual elements belonging to the illustrations, such as the words "tension" and "compression" and the arrow descriptions "+P" and "–P" in illustration 126 and the table entries in Table 4 (FIG. 4). Words and chemical symbols used in equations may also be among the detected related text elements. Such related text may be integral with or close to the illustration. The detection method relies on the co-occurrences of text positioned near an illustration.

Briefly, in the exemplary embodiment, text features of text elements proximate the illustration in question are considered in determining whether a text element is related to that illustration (as opposed to being related to another illustration or being text which is not related to any of the illustrations on the page). A text element may be assigned as proximate, e.g., given a value of 1 for example, if it is within a predetermined distance from a boundary which surrounds the graphical elements that are grouped together as an illustration, and/or closer to that boundary than to any other. Other text elements are considered remote (given a value of 0) and therefore ignored. Regularities over the document can also be used to identify text which is commonly linked to an illustration. For example, features of the text elements which can be considered in determining whether these text elements should be linked to a respective illustration can include font type (Arial, Courier, etc.), font style (bold, italic) font size, font color, textual content, and the like. For example, for the text element "FIG. 2.5", one or more of the font style, font type and regular use of the word "FIGURE" can be used to predict that this text is part of an image caption, by comparing these features with the features of other text elements that are proximate other image blocks throughout the document. In other embodiments, text elements that are wholly (or perhaps partially) within an illustration boundary need not be processed in this way. For example, the text elements "+P" and "–P" are readily assigned to their respective illustrations 116, 118, as they fall within the respective boundaries (shown in dotted lines), and thus their features do not really need to be considered.

The exemplary method thus allows for the detection of text elements that are sufficiently related to the illustrations by detecting regularities of co-occurrences. The detected text elements can correspond to captions but also to text elements present in a diagram. In the present embodiment, it is not necessary to apply overly-restrictive constraints in determining whether text is related to an illustration for the purpose of identifying numbered captions, since the step of sequence identification ensures that only text which obeys the numerical sequence is used to identify the caption number.

In the correction step (S112) over-segmentation of an illustration zone, which contains a large amount of white space between the candidate illustrations, is performed, for example, by determining whether there is an overlap between the boundaries of two illustrations, when those boundaries are increased to encompass the related text. Two (or more) overlapping illustrations are then considered to constitute a single illustration, the related text of both of them being associated with the combined illustration.

Each text element which meets the test for being a related text element is then linked to (associated with in memory) a respective single illustration 114, 126, 94 (S114).

Generation of an Imitation Document (S116)

Figure 7:
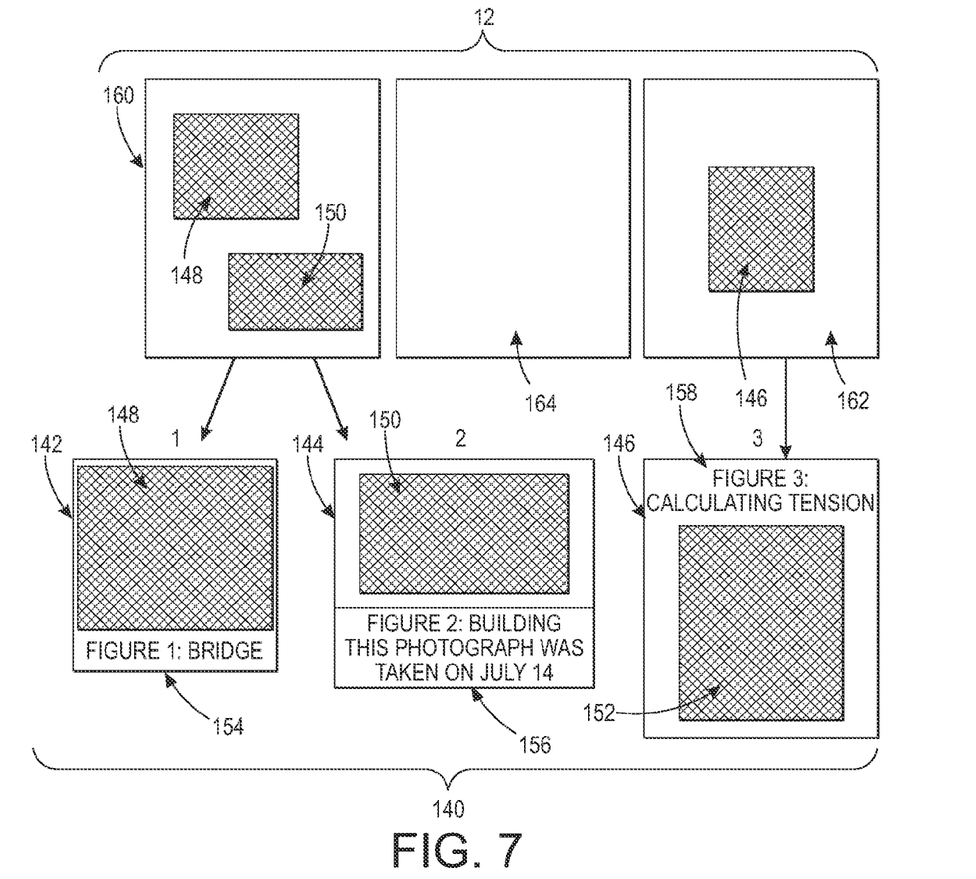
FIG. 7 graphically illustrates generation of an imitation document.

Once illustration zones and illustration-related text elements have been detected, an imitation document is generated by creating an imitation page per illustration 114, 126 and by adding to this page the related text that has been linked to this illustration. Several units of related textual elements can be added, such as words, lines, or even paragraphs. FIG. 7 graphically illustrates a three page imitation document 140, each imitation page 142, 144, 146 including exactly one illustration 148, 150, 152 and its associated text 154, 156, 158. The illustrations may be derived from the same or separate pages. For example, illustrations 148 and 150 and associated text are derived from one page 160 of the original document and illustration 152 and its associated text 158 is derived from a subsequent page 162 (intermediate page 164 has no relevant images). However, it is to be appreciated that an imitation document 140 may include many more pages than those illustrated, such as at least 5 or at least 10 or at least 20 imitation pages, depending on the size of the original document and the number of illustrations it contains. As will be appreciated from FIG. 7, the imitation pages of the document 140 need not be the same size.

Step S116 thus results in the generation of a sequence 140 of imitation pages 64, 66, etc., or 142, 144, 146 etc., analogous to a real document. The imitation document 140, however, includes only the illustrations detected at S112 and the related text detected at S114. All other elements are excluded from consideration (in particular, running text, headers and footers).

Identifying Caption Numbers (S118, S120)

The imitation document 140 can then be processed with a page number detector, serving as sequence detector 58, as described, for example, in U.S. Pat. No. 7,797,622 (U.S. Pub. No. 20080114757), entitled VERSATILE PAGE NUMBER DETECTOR) operating at the TOKEN level (or even at the sentence or paragraph level). The method generally includes identifying a plurality of text fragments associated with a plurality of pages of a single document (here the imitation pages of the imitation document), where each text fragment includes a string of one or more characters). From the identified text fragments, at least one sequence is identified, each sequence comprising a plurality of terms, where each term is derived from a respective text fragment selected from the plurality text fragments of a respective imitation page. The text fragments forming the sequence of terms are not limited to any specific location on the imitation pages, and they are not limited to being in any specific geometric relationship to the respective illustration. Thus, numbered captions above and below the respective images can still be detected as is the case in FIG. 7.

The terms of the sequence comply with at least one predefined numbering scheme which defines a form and an incremental state of the terms in a sequence. For example, the form of the numbering scheme may specify the static part as being an alphanumeric sequence of, for example, up to 20 characters in length, including spaces which is identical (or approximately so, allowing for minor OCR errors) in each term of the sequence. This would be satisfied by "FIGURE", in the examples illustrated, or by "TABLE" or "EXAMPLE" in other embodiments. The incremental part may be specified as containing Arabic numerals, Roman numerals (upper and/or lower case), letters (upper and/or lower case), other Ascii characters, or a combination of thereof, all of which are considered as "numbers" if they demonstrate in incremental pattern in the document. The incremental state may specify an increase by a constant value of 1 in the incremental part, with letters being treated as their numerical equivalents (satisfied by 2.1, 2.2, 2.3, etc. in the example of FIG. 4).

Each numbering scheme excludes terms from a given sequence which do not comply with an incremental state in which terms on each of two consecutive imitation pages vary by the constant value. The detection may allow for a limited number of gaps in the sequence, to allow for OCR errors and misidentification of imitation pages. For example, if "FIG. 2" is incorrectly identified by the OCR engine as "FIGURE L," this would create a gap in the sequence.

The sequence identification may thus include for each imitation page of a plurality of imitation pages in the imitation document, identifying text fragments which comprise a term that complies with the form of one of the predefined numbering schemes and for each of the identified fragments, determining if the term of the identified fragment complies with an incremental state accepted by an existing sequence and if so, adding the term to that sequence, the existing sequence comprising at least one term derived from a text fragment of a previous imitation page of the sequence of imitation pages. For each of the terms which do not comply with an incremental state accepted by an existing sequence, they can be considered as a potential start of a new sequence. To identify the most likely set of caption numbers, a subset of the identified sequences which cover at least some of the imitation pages of the sequence of imitation pages is identified. Ideally the identified sequences are those which best cover most or all of the imitation pages, allowing for some gaps as described above, while favoring longer sequences. As an example, the computing of the set of sequences may include applying a Viterbi algorithm to the identified sequences to identify a subset of the identified sequences. Then, at least some of the terms of the subset of the identified sequences are construed as numbered captions of the imitation pages, and hence of the respective images of the document 12, and are labeled as such. The remaining text related to an illustration is considered as belonging to the illustration.

The "page numbers" detected with the sequence detector 58 are thus each considered as a numbered caption (or as forming a part thereof). If the identification step was performed at the word level, it may be desirable for the full caption to be recognized rather than simply the number. If a higher textual level is available, in the form of a longer text string, such as a clause, sentence or paragraph, then the text string containing the "page number" is considered as the numbered caption.

As will be appreciated, numbered sequence detection methods could be employed without generation of imitation pages. However, particularly in the case of technical documents, where numbers or numbered patterns frequently occur in illustrations, detection of numbered captions is less effective. The constraint of having one numbered caption per image helps to address this problem, and is ensured in the present method, by using the "page number" method, which outputs a maximum of one numbered caption per imitation page.

In some cases, the method may have difficulty in the caption numbering stage due to over or under segmentation in the earlier stages (S108, S112). It may be assumed that when numbered captions are recognized for at least some of the images, then most of the images of the document will have a numbered caption. Missing captions can be easily detected by identifying illustrations that have no associated caption number. A confidence score can be computed for the image recognition stage. For example, the score may be computed as the ratio of the number of images that are lacking a found numbered caption to the total number of images. This score is a good estimation of the quality of the image recognition stage. It may be used as a guide to determining whether the segmentation should be rerun, at least on some of the illustrations, perhaps using different parameters.

Without intending to limit the scope of the exemplary embodiment, the following example demonstrates the applicability of the method to a large document.

Example

The method was evaluated on a 599 page document with more than 600 drawings. Some of these are diagrams which include both caption numbers as well as other text related to the illustration. The recognition of caption numbers is thus particularly challenging. Commercial OCRs fail to recognize these illustrations properly, and to recognize their captions.

Applying the present method led to a precision above 95%. Recall is much lower in this document (50%), resulting from some over- and under-segmentation errors when detecting images. Tested with documents where the image recognition is good, the method provides a very high precision and recall. Thus, the step of rerunning the image recognition stage when the confidence score is low is expected to yield recall improvements in challenging cases.

The example is illustrated with images, but it is also applicable to any type of document illustrations (such as tables, equations).

The example illustrates that the method of recognizing numbered captions as if they were page numbers of a document constructed by taking images plus their surrounding text to form pages is a novel but yet effective method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of detection of numbered captions in a document comprising:
   receiving a document comprising a sequence of document pages;
   identifying illustrations on pages of the document;
   for each identified illustration, identifying associated text;
   generating an imitation page for each of the identified illustrations, each of the imitation pages comprising only a single illustration and its associated text;

for a sequence of the imitation pages, with a processor, identifying a sequence of terms, each term comprising a text fragment of the associate text of a respective one of the imitation pages, the terms of the sequence complying with at least one predefined numbering scheme which defines a form and an incremental state of the terms in a sequence; and construing the terms of the identified sequence of terms as each being at least a part of a numbered caption for a respective illustration in the document.

2. The method of claim 1, wherein the identifying illustrations on pages of the document comprises:

for a document page:
identifying a set of graphical objects and a set of textual elements on the document page;
segmenting the document page into a plurality of image zones based on locations of the identified graphical objects without considering locations of the textual elements on the document page, the segmenting including segmenting the document page along horizontal and vertical cut lines, using white space between graphical elements to identify the suitable locations of the cuts; and
identifying illustrations based on the graphical objects in respective zones.

3. The method of claim 1, wherein the identifying of the set of graphical objects comprises:
identifying graphical elements on the document page;
identifying those of the graphical elements identified in the document page which are in headers and footers; and
excluding the graphical elements identified as being in headers and footers from the set of graphical objects.

4. The method of claim 1, wherein at least two imitation pages in the sequence of the imitation pages are generated from a same document page.

5. The method of claim 1, wherein the sequence of imitation pages comprises at least 10 imitation pages.

6. The method of claim 1, wherein the imitation pages in the sequence of the imitation pages are ordered in a same order as the identified illustrations in the document.

7. The method of claim 1 wherein each of the imitation pages excludes text from the respective document page which is identified as not being associated text for any of the illustrations identified on the document page.

8. The method of claim 1, wherein the at least one numbering scheme excludes terms from a sequence which do not comply with an incremental state in which terms on any two consecutive imitation pages in the sequence vary by a constant value.

9. The method of claim 1, wherein the at least one numbering scheme includes a numbering scheme selected from the group consisting of Arabic numerals, Roman numerals, composite numbering, Ascii characters, and combinations thereof.

10. The method of claim 1, wherein the identifying of the at least one sequence comprises, for each page of a plurality of pages of the sequence of imitation pages in sequence:

from the associated text elements, identifying text fragments which comprise a term complying with the form of the predefined numbering scheme;
for each of the identified fragments, determining if the term of the identified fragment complies with an incremental state accepted by an existing sequence and if so, adding the term to that sequence, the existing sequence comprising at least one term derived from a text fragment of a previous page of the document; and
for each of the terms which do not comply with an incremental state accepted by an existing sequence, considering the term as a potential start of a new sequence.

11. The method of claim 1, further comprising identifying text which is in a same text string as a term construed as being a numbered caption as being a part of the respective numbered caption.

12. The method of claim 1 further comprising converting the received document from an unstructured document format to a structured document format.

13. The method of claim 1 further comprising outputting document information related to numbered captions identified in the pages of the received document.

14. The method of claim 1, further comprising identifying those of the identified illustrations which comprise images and identifying those of the identified illustrations which comprise at least one of tables and equations and generating a first sequence of imitation pages for the illustrations comprising images and a second sequence of imitation pages for the illustrations comprising the least one of tables and equations.

15. The method of claim 1 wherein the graphical objects comprise at least one of vector graphics ad raster graphics.

16. The method of claim 1, wherein the numbered captions are derived from textual elements on multiple pages of the received document.

17. A computer program product comprising a non-transitory storage medium storing instructions which, when executed by a processor, perform the method of claim 1.

18. A system comprising memory which stores instructions for performing the method of claim 1 and a processor in communication with the memory for executing the instructions.

19. A system for detection of numbered captions comprising:
a graphical object detector for identifying illustrations on pages of a document comprising a sequence of document pages;
a related text detector for identifying associated text for each identified illustration;
an imitation page generator for generating an imitation page for each of the identified illustrations, each imitation page comprising only a single illustration and its associated text;
a sequence detector which, for a sequence of the imitation pages identifies a sequence of terms, each term derived from a text fragment of the associate text of a respective imitation page, the terms of a sequence complying with at least one predefined numbering scheme which defines a form and an incremental state of the terms in a sequence; and
a numbered captions identifier for construing the terms of the identified sequence of terms as numbered captions for respective illustrations in the document; and
a processor for implementing the graphical object detector, related text detector, imitation page generator, sequence detector, and numbered captions identifier.

20. A method of detection captions in a document comprising:
receiving a document comprising a sequence of document pages, the document pages comprising graphical elements and text elements;
identifying illustrations on pages of the document based on the graphical elements, comprising segmenting the page into illustration zones without considering any of the text elements on the pages, each zone comprising a respective illustration;

for each identified illustration, identifying associated text from the text elements;

generating an imitation page for each of the identified illustrations, each imitation page comprising only a single illustration and its associated text;

for a sequence of the imitation pages, with a processor, identifying a sequence of terms, each term derived from a text fragment of the associate text of a respective imitation page, the terms of a sequence complying with at least one predefined numbering scheme applicable to page numbers of a document; and identifying numbered captions for respective illustrations in the document based on the terms of the identified sequence of terms.

21. A computer program product comprising a non-transitory storage medium storing instructions which, when executed by a processor, perform the method of claim 20.

* * * * *